United States Patent
Jung et al.

(10) Patent No.: US 11,043,692 B2
(45) Date of Patent: Jun. 22, 2021

(54) NEGATIVE ELECTRODE AND SECONDARY BATTERY INCLUDING THE SAME

(71) Applicant: LG CHEM, LTD., Seoul (KR)

(72) Inventors: Hye Ri Jung, Daejeon (KR); Jung Pil Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 467 days.

(21) Appl. No.: 15/771,323

(22) PCT Filed: Jul. 4, 2017

(86) PCT No.: PCT/KR2017/007117
§ 371 (c)(1),
(2) Date: Apr. 26, 2018

(87) PCT Pub. No.: WO2018/008955
PCT Pub. Date: Jan. 11, 2018

(65) Prior Publication Data
US 2018/0309162 A1    Oct. 25, 2018

(30) Foreign Application Priority Data

Jul. 4, 2016 (KR) .................. 10-2016-0083959
Jul. 4, 2017 (KR) .................. 10-2017-0085056

(51) Int. Cl.
*H01M 4/02* (2006.01)
*H01M 4/13* (2010.01)
(Continued)

(52) U.S. Cl.
CPC ......... *H01M 10/0525* (2013.01); *H01M 4/02* (2013.01); *H01M 4/133* (2013.01);
(Continued)

(58) Field of Classification Search
CPC ...... H01M 4/02; H01M 4/133; H01M 4/1391; H01M 4/1393; H01M 4/364; H01M 4/583
See application file for complete search history.

(56) References Cited

U.S. PATENT DOCUMENTS 8,637,187 B2    1/2014  Fuse et al.
2007/0128518 A1   6/2007  Uono et al.
(Continued)

FOREIGN PATENT DOCUMENTS

CN    103022410 A    4/2013
CN    104126242 A    10/2014
(Continued)

OTHER PUBLICATIONS

Extended European Search Report, dated Dec. 13, 2018, for European Application No. 17824511.4.
(Continued)

*Primary Examiner* — Ula C Ruddock
*Assistant Examiner* — Frank A Chernow
(74) *Attorney, Agent, or Firm* — Morgan, Lewis & Bockius LLP

(57) ABSTRACT

Provided are a negative electrode including a current collector, a first active material layer including first active material particles and disposed on the current collector, and a first pattern and a second pattern alternately disposed separately from each other on the first active material layer, wherein the first pattern includes first pattern active material particles, the second pattern includes second pattern active material particles, a thickness of the first pattern is greater than a thickness of the second pattern, and a volume expansion rate of the second pattern is greater than a volume expansion rate of the first pattern, and a secondary battery including the negative electrode.

20 Claims, 1 Drawing Sheet

(51) Int. Cl.
  *H01M 4/36* (2006.01)
  *H01M 4/58* (2010.01)
  *H01M 10/0525* (2010.01)
  *H01M 4/587* (2010.01)
  *H01M 4/133* (2010.01)
  *H01M 4/1391* (2010.01)
  *H01M 4/1393* (2010.01)
  *H01M 4/583* (2010.01)
  *H01M 4/62* (2006.01)
  *H01M 4/66* (2006.01)
  *H01M 4/505* (2010.01)
  *H01M 4/525* (2010.01)
  *H01M 10/058* (2010.01)

(52) U.S. Cl.
  CPC ....... *H01M 4/1391* (2013.01); *H01M 4/1393* (2013.01); *H01M 4/364* (2013.01); *H01M 4/583* (2013.01); *H01M 4/587* (2013.01); *H01M 4/623* (2013.01); *H01M 4/661* (2013.01); *H01M 4/505* (2013.01); *H01M 4/525* (2013.01); *H01M 10/058* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2008/0274406 A1 | 11/2008 | Fuse et al. |
| 2013/0071552 A1 | 3/2013 | Teraki et al. |
| 2014/0287316 A1 | 9/2014 | Ahn et al. |
| 2016/0164079 A1* | 6/2016 | Bae .................... H01M 4/0404 429/231.8 |
| 2016/0226064 A1 | 8/2016 | Kitayoshi |
| 2016/0276657 A1 | 9/2016 | Song et al. |
| 2017/0125788 A1 | 5/2017 | Ahn et al. |

FOREIGN PATENT DOCUMENTS

| | | |
|---|---|---|
| CN | 204793058 U | 11/2015 |
| JP | 2006-49288 A | 2/2006 |
| JP | 2010-238426 A | 10/2010 |
| JP | 2013-8523 A | 1/2013 |
| JP | 2013-227189 A | 11/2013 |
| JP | 2014-191876 A | 10/2014 |
| JP | 2015-72753 A | 4/2015 |
| JP | 2016-58247 A | 4/2016 |
| KR | 10-2014-0095980 A | 8/2014 |
| KR | 10-1560471 B1 | 10/2015 |
| KR | 10-2016-0001481 A | 1/2016 |
| WO | WO 2016/018023 A1 | 2/2016 |
| WO | WO 2018/008954 A1 | 1/2018 |

OTHER PUBLICATIONS

Ko et al., "Challenges in Accomodating Volume Change of Si Anodes for Li-Ion Batteries", ChemElectroChem, vol. 2, 2015, pp. 1645-1651 (7 pages).

International Search Report for PCT/KR2017/007117 (PCT/ISA/210) dated Sep. 20, 2017.

* cited by examiner

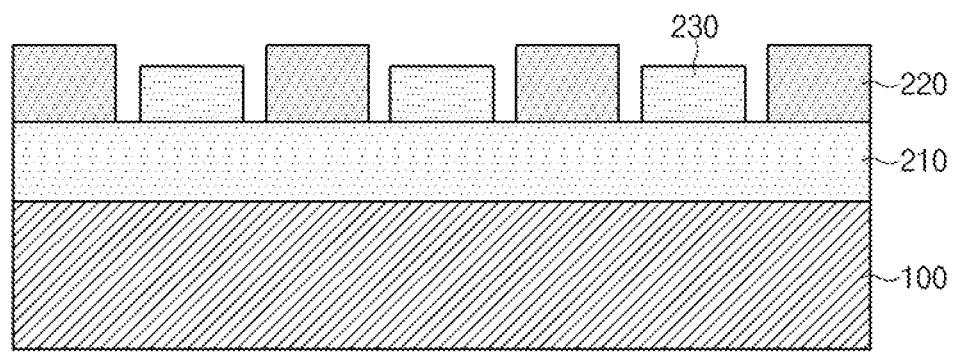

NEGATIVE ELECTRODE AND SECONDARY BATTERY INCLUDING THE SAME

TECHNICAL FIELD

This application claims priority to and the benefit of Korean Patent Application No. 10-2016-0083959, filed on Jul. 4, 2016 and Korean Patent Application No. 10-2017-0085056, filed on Jul. 4, 2017, the inventions of which are incorporated herein by reference in their entireties.

The present invention relates to a negative electrode and a secondary battery including the same, wherein the negative electrode may include a first active material layer, a first pattern, and a second pattern, a thickness of the first pattern is greater than a thickness of the second pattern, and a volume expansion rate of the second pattern is greater than a volume expansion rate of the first pattern.

BACKGROUND ART

The demand for use of alternative energy or clean energy is increasing due to a rapid increase in fossil fuel use, and to meet this demand, the most actively studied areas are fields of generation and accumulation of electricity using electrochemical reactions.

Currently, typical examples of electrochemical devices which utilize the electrochemical energy are secondary batteries, and an application area thereof is gradually increasing. Recently, the development of and demand for portable devices, such as a portable computer, a mobile phone, and a camera, are increasing such that the demand for the secondary batteries as energy sources is rapidly increasing, and many studies have been conducted on lithium secondary batteries, which exhibit high energy density and operating potentials and have long cycle lifetime and low self-discharge rates, among the secondary batteries, and the lithium secondary batteries also have been commercialized to be widely used.

Generally, a secondary battery includes a positive electrode, a negative electrode, an electrolyte, and a separator, and can be charged and discharged because energy transfer occurs while lithium ions reciprocate between both electrodes due to lithium ions discharged from a positive electrode active material by first charging being intercalated into a negative electrode active material such as carbon particles and then deintercalated when being discharged.

Meanwhile, the amount of the active material in a negative electrode is one of several factors determining a charging and discharging capacity of a battery. Accordingly, a negative electrode active material has been loaded at a high level on a surface of a current collector to manufacture high capacity electrodes. However, in the case of the electrode in which the active material is loaded at the high level, electrolyte wetting with respect to an active material layer decreases, and lithium ions intercalated into the active material layer or reacting with the active material are excessively and nonuniformly distributed. Specifically, lithium ion concentration can be high in an active material area near a surface of the active material layer which is in direct contact with electrolyte but can be excessively low in the active material layer area near a current collector. Accordingly, Li is precipitated on a surface of the electrode or an electrode capacity is reduced such that a rapid charging and discharging rate of a battery is lowered.

Although a method of increasing porosity of the active material layer is used to solve the above problems, an electrode thickness becomes thick to achieve the high capacity electrodes with the active material layer having the high porosity.

Accordingly, a negative electrode capable of improving electrolyte wetting, distribution of lithium ions in an active material layer, and a charging and discharging rate while maintaining a high capacity of a battery has been demanded.

DISCLOSURE

Technical Problem

The present invention is directed to providing a negative electrode capable of improving electrolyte wetting and a charging and discharging rate while maintaining a high capacity of a battery.

In addition, the present invention is directed to minimizing a thickness of an electrode and improving mechanical stability of the electrode while improving distribution of lithium ions in an active material layer.

Technical Solution

One aspect of the present invention provides a negative electrode including a current collector, a first active material layer including first active material particles and disposed on the current collector, and a first pattern and a second pattern alternately disposed separately from each other on the first active material layer, wherein the first pattern includes first pattern active material particles, the second pattern includes second pattern active material particles, a thickness of the first pattern is greater than a thickness of the second pattern, and a volume expansion rate of the second pattern is greater than a volume expansion rate of the first pattern.

Another aspect of the present invention provides a secondary battery including the negative electrode.

Advantageous Effects

Since a negative electrode according to the present invention includes a form in which a portion of a first active material layer is exposed to an electrolyte and a first pattern and a second pattern are separated from each other, electrolyte wetting and distribution of lithium ions in the negative electrode can be improved. Accordingly, Li is prevented from being precipitated on a surface of the negative electrode, a capacity of the electrode and a rapid charging and discharging rate can be improved. Further, configurations of the first pattern and the second pattern are adjusted so that thickness change of the negative electrode can be minimized or mechanical stability of the electrode can be improved.

DESCRIPTION OF DRAWINGS

FIG. 1 is a schematic cross-sectional diagram of a negative electrode according to one embodiment of the present invention.

MODES OF THE INVENTION

Hereinafter, the present invention will be described in more detail to facilitate understanding of the present invention.

The terms or words used in this specification and claims should not be understood as limited to the ordinary or dictionary meanings, and should be understood with the meanings and concepts corresponding to aspects of the present invention on the basis of the principle that the inventor suitably defines the concepts of the terms to describe the invention in the best way.

The terminology used herein is for the purpose of describing only exemplary embodiments only and is not intended to limit the invention. As used herein, the singular forms "a," "an," and "the" are intended to include the plural forms as well, unless the context clearly indicates otherwise.

It should be further understood that the terms "include," "provide," and/or "have" specify the presence of stated features, integers, steps, elements, and/or groups thereof, but do not preclude the presence or addition of one or more other features, integers, steps, elements, and/or groups thereof.

Referring to FIG. 1, a negative electrode according to one embodiment of the present invention may include a current collector, a first active material layer including first active material particles and disposed on the current collector, a first pattern and a second pattern alternately disposed separately from each other on the first active material layer, wherein the first pattern may include first pattern active material particles, the second pattern may include second pattern active material particles, a thickness of the first pattern may be greater than a thickness of the second pattern, and a volume expansion rate of the second pattern may be greater than a volume expansion rate of the first pattern.

A material having conductivity without causing a chemical reaction in the secondary battery, for example, copper, stainless steel, aluminum, nickel, titanium, calcined carbon, or aluminum or stainless steel having a surface treated with carbon, nickel, titanium, silver or the like may be used as the current collector.

According to one embodiment of the present invention, the first active material layer may be disposed on the current collector. Further, each of the first pattern and the second pattern may be disposed on the first active material layer. Referring to FIG. 1, a first active material layer 210 may be uniformly disposed on a current collector 100 without a separated portion. Each of a first pattern 220 and a second pattern 230 may be alternately disposed separately from each other on the first active material layer 210. Specifically, an uneven shape may be formed on the first active material layer by the first pattern and the second pattern.

In the case of a conventional negative electrode including a highly loaded active material layer without an uneven-shaped portion on a surface of the electrode, concentration of lithium ions is remarkably reduced from a vicinity of the surface of the electrode toward a vicinity of the surface of the current collector, and thus a charging and discharging rate and a capacity of a battery are lowered. According to one embodiment of the present invention, since a contact area between the negative electrode and an electrolyte may be increased according to the uneven shape formed by the first pattern and second pattern, electrolyte wetting and the charging and discharging rate of the battery can be improved. Furthermore, since a highly loaded first active material layer is exposed between the first pattern and the second pattern and the electrolyte may easily permeate in a current collector direction, electrolyte wetting may be further improved and nonuniformity of the distribution of lithium ions in the first active material layer, the first pattern, and the second pattern can be decreased.

The thickness of the first pattern may be greater than the thickness of the second pattern. Specifically, the thickness of the first pattern may be in a range of 1.1 to 3 times the thickness of the second pattern, and more specifically, may be in a range of 1.2 to 2 times the thickness of the second pattern.

A volume expansion rate of the second pattern may be greater than a volume expansion rate of the first pattern. The volume expansion rate may be calculated from the amount of increase of a thickness after a first cycle of charging and discharging with respect to an initial thickness of the first pattern or the second pattern. Specifically, the volume expansion rate means a ratio of the amount of variation in a thickness after a first charging and discharging cycle with respect to an initial electrode thickness. At this time, in the first charging and discharging cycle, constant current-constant voltage (CC-CV) charging is performed at 0.1 C and cuts off at 0.005 V and 0.005 C, and CC discharging is performed at 0.1 C and cuts off at 1.5 V.

The volume expansion rate may be calculated by the following Equation 1, the following thickness A may be the thickness of the first pattern or the second pattern before charging and discharging, and the following thickness B may be the thickness of the first pattern or the second pattern after charging and discharging.

$$\text{volume expansion rate} = [(B-A)/A] \times 100 \qquad \text{[Equation 1]}$$

The thickness may be measured with a micrometer, a macroscope, or a scanning electron microscope.

Although the second pattern has a relatively large volume expansion rate, the thickness of the second pattern can be prevented from being excessively greater than the thickness of the first pattern during charging and discharging because the thickness of the second pattern is relatively small. Accordingly, a thickness of the negative electrode may not excessively increase, and stress may not be excessively applied to the first pattern even when the second pattern does not come or comes in contact with the adjacent first pattern. Accordingly, a thickness of the battery can be prevented from excessively increasing due to electrode expansion upon charging, and mechanical stability of the electrode can be secured.

The first active material layer may include the first active material particles, the first pattern may include the first pattern active material particles, and the second pattern may include the second pattern active material particles.

The composition of at least one of the first active material particles, the first pattern active material particles, and the second pattern active material particles may be different from the compositions of the others.

According to one embodiment of the present invention, the first active material particles and the first pattern active material particles may be artificial graphite, and the second pattern active material particles may be natural graphite. Artificial graphite has a relatively superior lithium absorption capacity compared to natural graphite. Accordingly, since artificial graphite is used as the first active material particles and the first pattern active material particles included in the first active material layer and the first pattern which account for most of the components located on the current collector, a charging and discharging characteristic of the battery can be improved. Meanwhile, natural graphite has a higher lithium bonding amount than artificial graphite. Accordingly, since natural graphite is used as the second pattern active material particles included in the second pattern located on a surface of the electrode, a capacity of the battery can be improved.

Meanwhile, natural graphite has a relatively greater volume expansion rate than artificial graphite upon discharging. Accordingly, in a structure according to one embodiment of the present invention, although the second pattern has the relatively large volume expansion rate, the thickness of the second pattern can be prevented from being excessively greater than the thickness of the first pattern during charging and discharging because the thickness of the second pattern is relatively small. Accordingly, the thickness of the negative electrode may not excessively increase, and stress may not be excessively applied to the first pattern even when the second pattern does not come or comes in contact with the adjacent first pattern. Accordingly, the thickness of the battery can be prevented from excessively increasing due to the electrode expansion upon charging, and the mechanical stability of the electrode can be secured. The effect can be further improved because the first pattern and the second pattern are alternately disposed.

Another embodiment of the present invention is similar to the above-described embodiment, but differs in that the first active material particles are natural graphite, the first pattern active material particles and the second pattern active material particles are artificial graphite, and porosity of the second pattern is smaller than porosity of the first pattern.

Since natural graphite is used as the first active material particles included in a first active material layer, which account for most of the components located on the current collector, a capacity of a battery can be improved. Further, since artificial graphite is used as the first pattern active material particles and the second pattern active material particles, a charging and discharging characteristic of the battery can be improved. In addition, since both the first pattern and the second pattern located on a surface of a negative electrode include artificial graphite, the artificial graphite and an electrolyte primarily react. Accordingly, due to superior lithium absorption capacity of the artificial graphite, a charging rate of the negative electrode can be improved, and a side reaction at the surface of the negative electrode due to precipitation of lithium ions can also be minimized.

Further, since the porosity of the second pattern is smaller than the porosity of the first pattern, energy density is improved by the second pattern and thus the capacity of the battery can be improved. At the same time, since the porosity of the second pattern is smaller than the porosity of the first pattern, a volume expansion rate of the second pattern may be greater than a volume expansion rate of the first pattern. Although the second pattern has the relatively large volume expansion rate, a thickness of the second pattern can be prevented from being excessively greater than a thickness of the first pattern during charging and discharging because the thickness of the second pattern is relatively small. Accordingly, a thickness of the negative electrode may not excessively increase, and stress may not be excessively applied to the first pattern even when the second pattern does not come or comes in contact with the adjacent first pattern. Accordingly, a thickness of the battery can be prevented from excessively increasing due to electrode expansion upon charging, and mechanical stability of the electrode can be secured. Specifically, the first pattern may have a porosity 5 percentage points or more than that of the second pattern, and more specifically, the porosity of the first pattern may be in a range of 23% to 35% and the porosity of the second pattern may be in a range of 18% to 30%. The porosity may be calculated by the following Equation 2.

$$\text{porosity}=1-[\text{density of a configuration including pores}]/[\text{density of a configuration excluding pores}] \quad [\text{Equation 2}]$$

Still another embodiment of the present invention is similar to the above-described embodiment, but differs in that the first active material particles are artificial graphite, the first pattern active material particles and the second pattern active material particles are natural graphite, and porosity of the second pattern is smaller than porosity of the first pattern.

Since artificial graphite is used as the first active material particles included in a first active material layer which account for most of the components located on the current collector, a charging and discharging characteristic of a battery can be improved. At the same time, since natural graphite is used as the first pattern active material particles included in the first pattern and the second pattern active material particles included in the second pattern located on a surface of an electrode, a capacity of the battery can be improved.

Further, since the porosity of the second pattern is smaller than the porosity of the first pattern, energy density is improved by the second pattern and thus the capacity of the battery can be improved. At the same time, since the porosity of the second pattern is smaller than the porosity of the first pattern, a volume expansion rate of the second pattern may be greater than a volume expansion rate of the first pattern. Although the second pattern has the relatively large volume expansion rate, a thickness of the second pattern can be prevented from being excessively greater than a thickness of the first pattern during charging and discharging because the thickness of the second pattern is relatively small. Accordingly, a thickness of a negative electrode may not excessively increase, and stress may not be excessively applied to the first pattern even when the second pattern does not come or comes in contact with the adjacent first pattern. Accordingly, a thickness of the battery can be prevented from excessively increasing due to electrode expansion upon charging, and mechanical stability of the electrode can be secured. Specifically, the first pattern may have a porosity 5 percentage points or more than that of the second pattern, and more specifically, the porosity of the first pattern may be in a range of 23% to 35% and the porosity of the second pattern may be in a range of 18% to 30%. The porosity may be measured in the same method as the method described above.

In the embodiments of the present invention, each of the first active material layer, the first pattern, and the second pattern may include a binder and a conductive material.

A polyvinylidenefluoride-hexafluoropropylene copolymer (PVDF-co-HFP), polyvinylidenefluoride, polyacrylonitrile, polymethylmethacrylate, polyvinyl alcohol, carboxylmethyl cellulose (CMC), starch, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, styrene butadiene rubber (SBR), fluoro rubber, poly acrylic acid, and polymers in which hydrogen of the materials described above are substituted with Li, Na, Ca, or the like, or various copolymers, and the like may be used as the binder.

The conductive material is not particularly limited as long as it has conductivity without causing a chemical change in the battery, for example, graphite such as natural graphite or artificial graphite, carbon black such as carbon black, acetylene black, Ketjen black, channel black, furnace black, lamp black or thermal black, conductive fiber such as carbon fiber or metal fiber, a conductive tube such as a carbon nanotube, metal powder such as a powder of a fluorocarbon, aluminum or nickel, a conductive whisker such as zinc oxide or potassium titanate, or a conductive material such as a polyphenylene derivative may be used as the conductive material.

The negative electrode according to the embodiments of the present invention may be manufactured by coating the current collector with a slurry prepared by mixing an electrode material mixture including the active material, the conductive material, and the binder with a solvent and then drying and rolling the current collector coated with the slurry. Specifically, the first pattern and the second pattern may be formed on the first active material layer after forming the first active material layer on the current collector by the method described above. The first active material layer, the first pattern and the second pattern may be formed using at least one combination of a screen printing method, an inkjet printing method, a spray printing method, a gravure printing method, a heat transfer printing method, a Toppan printing method, an intaglio printing method, and an offset printing method. The solvent may be a solvent generally used in the technical field such as dimethyl sulfoxide (DMSO), isopropyl alcohol, N-methylpyrrolidone (NMP), acetone, or water, and either one or a mixture of at least two solvents among the solvents described above may be used.

More specifically, the first active material layer may be formed on the current collector by coating the current collector with a slurry for forming the first active material layer, drying and rolling the current collector coated with the slurry. Further, a second pattern having a specific thickness may be selectively formed on a portion of the first active material layer by coating with a slurry for forming the second pattern, drying and rolling, after a pattern mask is disposed on the first active material layer. In addition, another pattern mask may be disposed on the portion of the first active material layer and the second pattern to form the first pattern after removing the pattern mask. In addition, a first pattern having a specific thickness may be formed by coating with a slurry for forming the first pattern, drying and rolling. In addition, the pattern mask may be removed. A manufacturing method is not limited thereto, and the first pattern and the second pattern may be formed using an etching process in some cases.

The first active material particles, binder, and conductive material in the first active material layer may be included in a weight ratio of 94 to 98:2 to 4:0.3 to 2, the first pattern active material particles, binder and conductive material in the first pattern may be included in a weight ratio of 94 to 98:2 to 4:0.3 to 2, and the second pattern active material particles, binder, and conductive material in the second pattern may be included in a weight ratio of 94 to 98:2 to 4:0.3 to 2.

A secondary battery according to yet another embodiment of the present invention may include a negative electrode, a positive electrode, a separator interposed between the positive electrode and the negative electrode, and an electrolyte, and the negative electrode may be the electrode according to one embodiment of the present invention.

The positive electrode may be formed on a positive electrode current collector, and may include a positive electrode active material layer including a positive electrode active material.

In the positive electrode, the positive electrode current collector is not particularly limited as long as it has conductivity without causing a chemical reaction in the battery, for example, stainless steel, aluminum, nickel, titanium, calcined carbon, or aluminum or stainless steel having a surface treated with carbon, nickel, titanium, silver or the like may be used as the positive electrode current collector. Further, the positive electrode current collector may generally have a thickness of 3 to 500 μm, and adhesion of the positive electrode active materials may be improved by forming a fine uneven shape on the current collector surface. For example, the positive electrode current collector may be used in various shapes such as a film, a sheet, a foil, a net, a porous body, a foam, and a nonwoven fabric.

The positive electrode active materials may be generally used positive electrode active materials. Specifically, the positive electrode active materials may include a layered compound such as lithium cobalt oxide ($LiCoO_2$) or lithium nickel oxide ($LiNiO_2$), a compound substituted with at least one transition metal, lithium iron oxide such as $LiFe_3O_4$, lithium manganese oxide represented by a chemical formula such as $Li_{1+c1}Mn_{2-c1}O_4$ ($0 \leq c1 \leq 0.33$), $LiMnO_3$, $LiMn_2O_3$, or $LiMnO_2$, lithium copper oxide ($Li_2CuO_2$), vanadium oxide such as $LiV_3O_8$, $V_2O_5$, or $Cu_2V_2O_7$, a Ni-site type lithium nickel oxide represented by a chemical formula $LiNi_{1-c2}M_{c2}O2$ (here, M is at least one selected from the group consisting of Co, Mn, Al, Cu, Fe, Mg, B, and Ga, and $0.01 \leq c2 \leq 0.3$ is satisfied), a lithium manganese composite oxide represented by a chemical formula $LiMn_{2-c3}M_{c3}O_2$ (here, M is at least one selected from the group consisting of Co, Ni, Fe, Cr, Zn, and Ta, and $0.01 \leq c3 \leq 0.1$ is satisfied) or $Li_2Mn_3MO_8$ (here, M is at least one selected from the group consisting of Fe, Co, Ni, Cu, and Zn), and $LiMn_2O_4$ in which some of Li in a chemical formula is substituted with alkaline earth metal ions, but the positive electrode active materials are not limited thereto. The positive electrode may be formed of a Li-metal.

The positive electrode active material layer may include a positive electrode active material described above, a positive electrode conductive material and a positive electrode binder.

Here, since the positive electrode conductive material is used for imparting conductivity to the electrode, the positive electrode conductive material may be used without particular limitation as long as it has conductivity without causing a chemical change in a formed battery. Graphite such as natural graphite or artificial graphite, carbon-based materials such as carbon black, acetylene black, Ketjen black, channel black, furnace black, lamp black, thermal black or carbon fiber, powder or fiber of a metal such as copper, nickel, aluminum or silver, a conductive whisker such as zinc oxide or potassium titanate, and a conductive polymer such as a polyphenylene derivative may be specific examples of the conductive material, and either one or combinations of at least two materials among the materials described above may be used.

Further, the positive electrode binder improves adhesion between the positive electrode active material particles, and adhesion between the positive electrode active materials and the positive electrode current collector. Polyvinylidenefluoride (PVDF), PVDF-co-HFP, polyvinyl alcohol, polyacrylonitrile. CMC, starch, hydroxypropyl cellulose, regenerated cellulose, polyvinyl pyrrolidone, tetrafluoroethylene, polyethylene, polypropylene, EPDM, sulfonated-EPDM, SBR, fluoro rubber, and various copolymers thereof may be specific examples of the positive electrode binder, and either one or combinations of at least two binders among the binders described above may be used The separator separates the negative electrode and the positive electrode, and provides a path for the lithium ions, the separator may be used without particular limitation as long as it is generally used as a separator in a secondary battery, and particularly, a separator having a low resistance against movement of ions in the electrolyte and a superior electrolyte wetting characteristic is desirable. Specifically, a porous polymer film, for example, a porous polymer film formed of a polyolefin-based polymer such as an ethylene homopolymer, a propylene homopolymer, an ethylene/ butene copolymer, an ethylene/hexene copolymer, or an ethylene/methacrylate copolymer, or a stacked structure having two or more layers made of the polyolefin based polymers may be used. Further, a general porous nonwoven fabric, for example, a nonwoven fabric formed of glass fiber having a high melting point, polyethylene terephthalate fiber may be used. In addition, a coated separator including ceramic components or polymer materials may be used to secure heat resistance or mechanical strength, and may be selectively used in a single layer or a multilayer structure.

Examples of the electrolyte may be such as an organic liquid electrolyte, an inorganic liquid electrolyte, a solid polymer electrolyte, a gel type polymer electrolyte, a solid inorganic electrolyte, or a molten type inorganic electrolyte usable in the manufacture of a lithium secondary battery, but is not limited thereto.

Specifically, the electrolyte may include a non-aqueous organic solvent and a metallic salt.

For example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, a phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, or ethyl propionate may be used as the non-aqueous organic solvent.

Particularly, a cyclic carbonate such as ethylene carbonate and propylene carbonate among the carbonate organic solvents is an organic solvent having high-viscosity and may be desirably used because the carbonate has a high dielectric constant and dissociates lithium salts well, and, when the cyclic carbonate is mixed with a linear carbonate having low-viscosity and a low dielectric constant such as dimethyl carbonate or diethyl carbonate in an appropriate ratio, an electrolyte having high conductivity may be formed and thus the carbonate can be more desirably used.

The metallic salts may be a lithium salt, and the lithium salt may be easily dissolved in the non-aqueous electrolyte, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

In addition to the electrolyte components, at least one additive, for example, a haloalkylene carbonate-based compound such as difluoro ethylene carbonate, pyridine, triethyl phosphite, triethanolamine, a cyclic ether, ethylene diamine, n-glyme, hexaphosphoric triamide, a nitrobenzene derivative, sulfur, a quinoneimine dye, N-substituted oxazolidinone, N, N-substituted imidazolidine, an ethylene glycol dialkyl ether, ammonium salts, pyrrole, 2-methoxyethanol, aluminum trichloride or the like may be further included in the electrolyte to improve a lifetime characteristic of the battery, suppress battery capacity reduction, improve a discharging capacity of the battery.

According to yet another embodiment of the present invention, a battery module including the secondary battery as a unit cell and a battery pack including the battery module are provided. Since the battery module and the battery pack include the secondary battery having a high capacity, a high rate-limiting characteristic, and a high cycle characteristic, the battery module and the battery pack may be used as a power supply of a medium and large device selected from the group consisting of electric vehicles, hybrid electric vehicles, plug-in hybrid electric vehicles, and power storage systems.

Hereinafter, although exemplary embodiments of the present invention will be described in order to aid in understanding the present invention, the embodiments only exemplify the present invention and it will be apparent to those skilled in the art that various modifications may be made to the above-described exemplary embodiments of the present invention without departing from the spirit or scope of the present invention, and thus, it is intended that all such modifications come within the scope of the appended claims.

EXAMPLES AND COMPARATIVE EXAMPLES

Example 1: Manufacture of Battery (1) Manufacture of Negative Electrode

1) Formation of First Active Material Layer 5 g of a mixture was manufactured by mixing artificial graphite having an average diameter ($D_{50}$) of 20.4 μm, carbon black which is a conductive material, and CMC and SBR which are binders in a weight ratio of 95.8:1:1.7:1.5. A negative electrode slurry was manufactured by adding 28.9 g of distilled water to the mixture. A copper current collector having a thickness of 20 μm was coated with the negative electrode slurry and dried. At this time, a temperature of circulating air was 120° C. Afterward, a first active material layer having a thickness of 50 μm was formed by performing a rolling process.

2) Formation of Second Pattern 5 g of a mixture was manufactured by mixing natural graphite having an average diameter ($D_{50}$) of 15 μm which is second pattern active material particles, carbon black which is a conductive material, and CMC and SBR which are binders in a weight ratio of 95.8:1:1.7:1.5. A negative electrode slurry was manufactured by adding 28.9 g of distilled water to the mixture. Meanwhile, a portion of a first active material layer was coated with the negative electrode slurry and dried after a pattern mask was disposed on the portion of the first active material layer. At this time, a temperature of the circulating air was 120° C. Afterward, a second pattern having a thickness of 20 μm and a porosity of 25% was formed by removing the pattern mask and performing a rolling process.

3) Formation of First Pattern 5 g of a mixture was manufactured by mixing artificial graphite having an average diameter ($D_{50}$) of 20 μm which is first pattern active material particles, carbon black which is a conductive material, and CMC and SBR which are binders in a weight ratio of 95.8:1:1.7:1.5. A negative electrode slurry was manufactured by adding 28.9 g of distilled water to the mixture. Meanwhile, a first active material layer was coated with the negative electrode slurry and dried after the pattern mask was disposed on a portion of the first active material layer and the second pattern. At this time, a temperature of the circulating air was 120° C. Afterward, a first pattern having a thickness of 40 μm and a porosity of 25% was formed by removing the pattern mask and performing a rolling process.

4) Drying and Punching Process

Afterward, a negative electrode was manufactured by punching the current collector on which the first active material layer, the first pattern, and the second pattern are formed, in a circular shape of 1.4875 $cm^2$ after the current collector was dried in a vacuum oven at 130° C. for 12 hours.

(2) Manufacture of Battery

A battery was manufacturing using a lithium metal film cut in a circular shape of 1.7671 cm² as a negative electrode, and using the manufactured negative electrode as a positive electrode. Specifically, an electrode assembly was manufactured by interposing a porous polyethylene separator between the positive electrode and the negative electrode. Meanwhile, an electrolyte was prepared by dissolving 0.5% of vinylene carbonate (VC) and dissolving 1M LiPF$_6$ in a mixed solution in which ethylene carbonate (EC) and ethylmethyl carbonate (EMC) are mixed in a volume mixing ratio of 7:3. A coin-type lithium half cell was manufactured by injecting the electrolyte into the electrode assembly.

Example 2: Manufacture of Battery (1) Manufacture of Negative Electrode and the Battery A negative electrode and a battery were manufactured with the same method as in Example 1 except that natural graphite having an average diameter (D$_{50}$) of 16 μm was used as first active material particles, artificial graphite having an average diameter (D$_{50}$) of 20 μm was used as first pattern active material particles, and artificial graphite having an average diameter (D$_{50}$) of 15.6 μm was used as second pattern active material particles. At this time, a first active material layer had a thickness of 50 μm. Further, a first pattern had a thickness of 40 μm and a porosity of 28%. In addition, a second pattern had a thickness of 20 μm and a porosity of 23%.

Example 3: Manufacture of Battery (1) Manufacture of Negative Electrode and Battery A negative electrode and a battery were manufactured with the same method as in Example 1 except that artificial graphite having an average diameter (D$_{50}$) of 20.4 μm was used as first active material particles, natural graphite having an average diameter (D$_{50}$) of 13 μm was used as first pattern active material particles, and natural graphite having an average diameter (D$_{50}$) of 16 μm was used as second pattern active material particles. At this time, a first active material layer had a thickness of 50 Further, a first pattern had a thickness of 40 μm and a porosity of 28%. In addition, a second pattern had a thickness of 20 μm and a porosity of 23%.

Comparative Example 1: Manufacture of Battery (1) Manufacture of Negative Electrode and Battery A negative electrode and a battery were manufactured with the same method as in Example 1 except that a thickness of a first pattern was 20 μm and a thickness of a second pattern was 40 μm.

Comparative Example 2: Manufacture of Battery (1) Manufacture of Negative Electrode and Battery A negative electrode and a battery were manufactured with the same method as in Example 2 except that a thickness of a first pattern was 30 μm and a thickness of a second pattern was 30 μm.

Comparative Example 3: Manufacture of Battery (1) Manufacture of Negative Electrode and Battery A negative electrode and a battery were manufactured with the same method as in Example 3 except that a thickness of a first pattern was 20 μm and a thickness of a second pattern was 40 μm.

Experimental Example 1: Evaluation of Volume Expansion Rates of the First Patterns and the Second Patterns, Thickness Change Rates of Electrodes, and Cycle Characteristics Volume expansion rates, discharging capacities, initial efficiency, capacity retention rates and the thickness change rates of the electrodes were evaluated by subjecting the batteries according to Examples 1 to 3 and Comparative Examples 1 to 3 to charging and discharging, and results thereof are shown in the following Table 1.

Meanwhile, charging and discharging were performed at 0.1 C in 1$^{st}$ and 2$^{nd}$ cycles and at 0.5 C in 3$^{rd}$ to 49$^{th}$ cycles. A 50$^{th}$ cycle was ended in a charged state (a state in which lithium is intercalated in a negative electrode), and the capacity retention rates were evaluated.

Charging condition: CC/CV (5 mV/0.005 C current cut-off)

Discharging condition: CC condition 1.5V

The discharging capacities (mAh/g) and the initial efficiency (%) were derived through the results after a first cycle of charging and discharging. Specifically, the initial efficiency (%) was calculated as follows:

initial efficiency (%)=(discharging capacity after 1$^{st}$ discharging/1$^{st}$ charge capacity)×100

Each of the capacity retention rates and the thickness change rates of the electrodes were calculated as follows:

capacity retention rate (%)=(49$^{th}$ discharge capacity/ 1$^{st}$ discharge capacity)×100 thickness change rate of electrode (%)=(Difference between final electrode thickness and initial electrode thickness/initial thickness of electrode)×100

The volume expansion rates of the first pattern or the second pattern were calculated by the following Equation 1, the following thickness A includes a thickness of the first pattern or a thickness of the second pattern before charging and discharging, and the following thickness B includes a thickness of the first pattern or a thickness of the second pattern after charging and discharging.

volume expansion rate=[(B−A)/A]×100 [Equation 1]

The thicknesses were measured by a micrometer.

TABLE 1

| Battery | Volume expansion rate of first pattern (%) | Volume expansion rate of second pattern (%) | Discharging capacity (mAh/g) | Initial efficiency (%) | Capacity retention rate (%) | Thickness change rate of electrode (%) |
|---|---|---|---|---|---|---|
| Example 1 | 4 | 6 | 354 | 92.3 | 98.1 | 1.0 |
| Example 2 | 3 | 5 | 364 | 94.4 | 95.8 | 1.5 |
| Example 3 | 5 | 7 | 362 | 94 | 96.7 | 1.2 |
| Comparative Example 1 | 4 | 6 | 354 | 91 | 95.0 | 2.0 |

TABLE 1-continued

| Battery | Volume expansion rate of first pattern (%) | Volume expansion rate of second pattern (%) | Discharging capacity (mAh/g) | Initial efficiency (%) | Capacity retention rate (%) | Thickness change rate of electrode (%) |
|---|---|---|---|---|---|---|
| Comparative Example 2 | 4 | 4.5 | 358 | 92 | 94.3 | 2.6 |
| Comparative Example 3 | 5 | 7 | 355 | 90.4 | 94.6 | 2.4 |

When Example 1 was compared to Comparative Example 1, Example 2 was compared to Comparative Example 2, and Example 3 was compared to Comparative Example 3, the electrode thickness change rates of the examples were relatively small, and the discharging capacity and capacity retention rate of the examples were relatively large. This is considered to be due the fact that the thicknesses of the second patterns having relatively high volume expansion rates are smaller than the thicknesses of the first patterns, thickness change of the positive electrode thickness may be small when charging and discharging are repeated and a portion of the first active material layer which is in contact with the electrolyte may be sufficiently secured.

The invention claimed is:

1. A negative electrode comprising:
a current collector; a first active material layer including first active material particles and disposed on the current collector; and
a first pattern stripe and a second pattern stripe alternately disposed separately from each other on the first active material layer, wherein:
the first pattern stripe includes first pattern active material particles;
the second pattern stripe includes second pattern active material particles;
a thickness of the first pattern stripe is greater than a thickness of the second pattern stripe; and
a volume expansion rate of the second pattern stripe is greater than a volume expansion rate of the first pattern stripe,
wherein compositions of the first pattern active material particles and the second pattern active material particles are different from each other or porosity of the first pattern stripe and the second pattern stripe are different from each other.

2. The negative electrode according to claim 1, wherein:
the first active material particles and the first pattern active material particles include artificial graphite; and
the second pattern active material particles include natural graphite.

3. The negative electrode according to claim 1, wherein:
the first active material particles include natural graphite;
the first pattern active material particles and the second pattern active material particles include artificial graphite; and
porosity of the second pattern stripe is lower than porosity of the first pattern stripe.

4. The negative electrode according to claim 3, wherein a difference between the porosity of the first pattern stripe and the porosity of the second pattern stripe is 5 percentage points or more.

5. The negative electrode according to claim 1, wherein:
the first active material particles include artificial graphite;
the first pattern active material particles and the second pattern active material particles include natural graphite; and
porosity of the second pattern stripe is lower than porosity of the first pattern stripe.

6. The negative electrode according to claim 5, wherein a difference between the porosity of the first pattern stripe and the porosity of the second pattern stripe is 5 percentage points or more.

7. The negative electrode according to claim 1, wherein the thickness of the first pattern stripe is in a range of 1.1 to 3 times the thickness of the second pattern stripe.

8. A secondary battery comprising:
the negative electrode of claim 1;
a positive electrode;
a separator interposed between the positive electrode and the negative electrode; and an electrolyte.

9. The negative electrode according to claim 1, wherein the thickness of the first pattern stripe is in a range of 1.2 to 2 times the thickness of the second pattern stripe.

10. The negative electrode according to claim 1, wherein the first pattern stripe has a porosity 5% or more than a porosity of the second pattern stripe.

11. The negative electrode according to claim 1, wherein a porosity of the first pattern is in a range of 23% to 35%.

12. The negative electrode according to claim 1, wherein a porosity of the second pattern is in a range of 18% to 30%.

13. The negative electrode according to claim 1, wherein the first active material layer, the first pattern stripe, and the second pattern stripe include a binder and a conductive material.

14. The negative electrode according to claim 13, wherein the binder comprises a polyvinylidenefluoride-hexafluoropropylene copolymer (PVDF-co-HFP), polyvinylidenefluoride, polyacrylonitrile, polymethylmethacrylate, polyvinyl alcohol, carboxylmethyl cellulose (CMC), starch, hydroxypropyl cellulose, a regenerated cellulose, polyvinyl pyrrolidone, tetrafluoroethylene, polyethylene, polypropylene, polyacrylic acid, an ethylene-propylene-diene monomer (EPDM), a sulfonated EPDM, styrene butadiene rubber (SBR), a fluoro rubber, or poly acrylic acid.

15. The negative electrode according to claim 13, wherein the conductive material comprises natural graphite, artificial graphite.

16. The negative electrode according to claim 13, wherein the conductive material comprises carbon black, acetylene black, Ketjen black, channel black, furnace black, lamp black or thermal black.

17. The negative electrode according to claim 13, wherein the conductive material comprises: a carbon fiber; a metal fiber; a carbon nanotube; a powder of fluorocarbon, aluminum or nickel; zinc oxide; potassium titanate; or a polyphenylene derivative.

18. The negative electrode according to claim 1, wherein the first active material layer includes the first active material particles, a binder, and a conductive material in a weight ratio of 94 to 98:2 to 4:0.3 to 2.

19. The negative electrode according to claim 1, wherein the first pattern stripe includes the first pattern active material particles, a binder, a conductive material in a weight ratio of 94 to 98:2 to 4:0.3 to 2.

20. The negative electrode according to claim 1, wherein the second pattern stripe includes the second pattern active material particles, a binder, a conductive material in a weight ratio of 94 to 98:2 to 4:0.3 to 2.

\* \* \* \* \*